US012011730B2

(12) United States Patent
Barker

(10) Patent No.: US 12,011,730 B2
(45) Date of Patent: Jun. 18, 2024

(54) APPARATUS FOR STABILIZING A LOOSE SHOWERHEAD

(71) Applicant: LOURA HOLDINGS, LLC, Evansville, IN (US)

(72) Inventor: Dennis Barker, Evansville, IN (US)

(73) Assignee: Laura Holdings, LLC, Evansville, IN (US)

( * ) Notice: Subject to any disclaimer, the term of this patent is extended or adjusted under 35 U.S.C. 154(b) by 0 days.

(21) Appl. No.: 18/345,147

(22) Filed: Jun. 30, 2023

(65) Prior Publication Data

US 2023/0347371 A1 Nov. 2, 2023

Related U.S. Application Data

(62) Division of application No. 17/557,280, filed on Dec. 21, 2021, now Pat. No. 11,731,155.

(60) Provisional application No. 63/141,567, filed on Jan. 26, 2021.

(51) Int. Cl.

| | |
|---|---|
| ***E03C 1/06*** | (2006.01) |
| ***B05B 15/14*** | (2018.01) |
| ***E03C 1/02*** | (2006.01) |
| ***E03C 1/04*** | (2006.01) |

(52) U.S. Cl.

CPC .............. *B05B 15/14* (2018.02); *E03C 1/021* (2013.01); *E03C 1/0408* (2013.01); *E03C 1/06* (2013.01)

(58) Field of Classification Search

CPC .......... E03C 1/021; E03C 1/0408; E03C 1/06; B05B 15/14

See application file for complete search history.

(56) References Cited

U.S. PATENT DOCUMENTS

| | | | | |
|---|---|---|---|---|
| 4,516,749 | A | 5/1985 | Sullivan | |
| 4,739,596 | A | 4/1988 | Cunningham et al. | |
| 6,192,529 | B1 | 2/2001 | Jones et al. | |
| 6,378,912 | B1 | 4/2002 | Condon et al. | |
| 7,373,674 | B1 | 5/2008 | Condon | |
| 9,068,325 | B2 * | 6/2015 | Neagoe | E03C 1/0408 |
| 9,273,452 | B2 | 3/2016 | Wilson | |
| 9,410,308 | B2 | 8/2016 | Jaye | |
| 9,453,609 | B2 | 9/2016 | Alexander | |

(Continued)

FOREIGN PATENT DOCUMENTS

| | | | |
|---|---|---|---|
| CA | 2334191 | A1 | 8/2001 |
| CN | 107130665 | A | 6/2017 |

(Continued)

*Primary Examiner* — Kevin F Murphy

(74) *Attorney, Agent, or Firm* — Martin IP Law Group; C. Richard Martin

(57) ABSTRACT

A shower stabilizer assembly for use in connection with a broken or loose showerhead assembly is provided. The assembly includes a stabilizer plate, one or more spacers of varying sizes/thicknesses, and a plurality of fasteners to secure the stabilizer plate to a structure. The stabilizer plate comprises a cylindrically shaped spacer contact nipple having a first end affixed to a flange that extends outwardly from the spacer contact nipple and has a circular opening aligned with an interior of the cylindrically shaped spacer contact nipple for receiving a shower pipe arm of the showerhead assembly. The opening in the flange and interior of the cylindrically shaped spacer contact nipple are sized to receive the shower pipe arm.

6 Claims, 7 Drawing Sheets

(56) References Cited

U.S. PATENT DOCUMENTS

| | | | |
|---|---|---|---|
| 9,506,230 | B2 | 11/2016 | Schulte |
| 10,245,610 | B2 | 4/2019 | Johnson |
| 10,309,557 | B2 | 6/2019 | Kipp |
| 10,570,592 | B2 | 2/2020 | Snitil |
| 2004/0256303 | A1 | 12/2004 | Talbot et al. |
| 2019/0211537 | A1 | 7/2019 | Massey |

FOREIGN PATENT DOCUMENTS

| | | | |
|---|---|---|---|
| CN | 208535376 | U | 8/2018 |
| KR | 101768952 | B1 | 8/2017 |

* cited by examiner

APPARATUS FOR STABILIZING A LOOSE SHOWERHEAD

BACKGROUND OF THE INVENTION

Field of the Invention

The present invention relates to a device and method for fixing loose plumbing components. More specifically, the present invention relates to a device and method for fixing a loose showerhead assembly without removing the drywall surrounding the shower arm of the showerhead assembly to access the plumbing inside the wall.

Description of the Related Art

As shown in FIG. 1, a typical showerhead assembly 30 includes a drop ear elbow fitting 33, a shower arm 34 and a showerhead 32. The drop ear elbow fitting 33 is attached to the water source by a supply line 37 and located behind the shower wall 39 (Not shown in FIG. 1, but see e.g. FIG. 10). The drop ear elbow 33 is attached to a shower arm 34 which extends into the shower through an opening 41 in the shower wall 39. Finally, a showerhead 32 is affixed to the end of the shower arm 34.

A loose showerhead assembly 30 is a common plumbing problem that homeowners and building managers face. A loose showerhead assembly typically occurs when a drop ear elbow fitting 33 fails. In a typical showerhead assembly, the drop ear elbow fitting 33 is secured to a scab board 35 during construction. The drop ear elbow fitting 33 also mates the water supply line 37 to the shower arm pipe 34. A drop ear elbow fitting 33 may fail, typically with one or more of the ears 33*a* breaking free from the main body of the fitting 33, as a result of an impact to the showerhead assembly or of normal wear and tear caused by showerhead adjustment or replacement. A broken drop ear elbow fitting 33 may fail to secure the showerhead assembly 30 to the scab board 35 resulting in a loose showerhead assembly.

The typical solution to a loose showerhead assembly employed by those of skill in the art requires one to remove a portion of the drywall surrounding the shower arm to access the plumbing inside the wall and reveal the broken drop ear elbow fitting in need of replacement. After the plumbing is stabilized, one must: measure and cut a new piece of drywall surrounding the shower arm, affix the new piece of drywall, apply mud to the joints, apply tape to the joints, reapply mud to the joints, sand the joints, and repaint the wall. In some showers it may be impossible to fix a loose showerhead assembly without completely replacing the shower wall materials.

Accordingly, there is a need for a device and method for fixing a loose showerhead assembly without removing the drywall surrounding the shower arm or replacing the shower wall materials.

SUMMARY OF THE INVENTION

It is therefore an object of the present invention to provide a device and method that is less cumbersome and quickly fixes a loose showerhead assembly.

It is also an object of the invention to provide a device and method that more affordably fixes a loose showerhead assembly.

It is further an object of the invention to provide a device and method for fixing a loose shower head that can be used by professional plumbers as well as homeowners.

The present invention meets these objects by providing a stabilizer, spacers, and method for quickly fixing a loose showerhead assembly without the added cost and labor of removing drywall or replacing the shower wall materials.

According to one presently preferred embodiment of the invention, there is provided a showerhead stabilizer assembly for use in connection with a broken or loose showerhead assembly. The showerhead stabilizer assembly comprises a stabilizer plate, at least one cylindrically shaped spacer, and a plurality of fasteners. The stabilizer plate comprises a cylindrically shaped spacer contact nipple having a first end affixed to a flange. The flange extends outwardly from the spacer contact nipple and has a circular opening therein that is aligned with an interior of the cylindrically shaped spacer contact nipple for receiving a shower pipe arm of the showerhead assembly. The opening in the flange and interior of the cylindrically shaped spacer contact nipple is also sized to receive the shower pipe arm therein. The at least one cylindrically shaped spacer has a length and an interior sized to receive the shower pipe arm therein. The plurality of fasteners each have a first end configured to engage a surface of the circular flange and a second end configured to engage a structural surface proximate to the showerhead assembly.

The flange may be circular shaped and may extend radially outwardly from the spacer contact nipple. The at least one cylindrically shaped spacer may comprise a plurality of cylindrically shaped spacers, and each of the plurality of spacers may have a different length. The plurality of fasteners may comprise a plurality of screws. Each screw may have a first threaded end for engaging the structural surface and a second end may have a head for engaging the flange. The flange may include a plurality of openings therein, each opening sized to allow the first end and a shaft of the screw to pass through, but engage the head.

According to a further presently preferred embodiment of the invention, there is provided a method for repairing a loose showerhead assembly using a showerhead stabilizer assembly. First, a showerhead is removed from a first end of a shower pipe arm of the showerhead assembly to expose the shower pipe arm at a point where it projects through an opening in a shower wall. Second, a cylindrically shaped spacer having a length and an interior sized to receive said shower pipe arm is installed therein about the shower pipe arm until a first end of the spacer comes into contact with an elbow fitting attached to a second end of the shower pipe arm. Third, a stabilizer plate comprising a cylindrically shaped spacer contact nipple having a first end affixed to a flange and a second free end is installed about the shower pipe arm until the second free end of the stabilizer plate comes into contact with a second free end of the spacer and a rear surface of the flange comes into contact with the shower wall. Fourth, the stabilizer plate is secured to a structural surface behind the shower wall with a plurality of fasteners. The method for repairing a loose showerhead assembly may further include the step of installing a flange having a circular opening onto the shower pipe arm to cover the stabilizer plate.

The step of installing a cylindrically shaped spacer may include sequentially installing a plurality of cylindrically shaped spacers until a hard stop is created against the elbow fitting. Each of the plurality of spacers may have a different length. The step of securing the stabilizer plate may include installing a plurality of fasteners such that a first end of each of said fasteners engages a surface of the flange and a second end of each fastener engages the structural surface behind the shower wall. The plurality of fasteners may comprise a plurality of screws, each screw having a first threaded end for engaging the structural surface and a second end having a head for engaging the flange. The flange may includes a plurality of openings therein, each opening sized to allow the first end and a shaft of the screw to pass through, but engage the head. The flange may be circular shaped and may extend radially outwardly from the spacer contact nipple.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
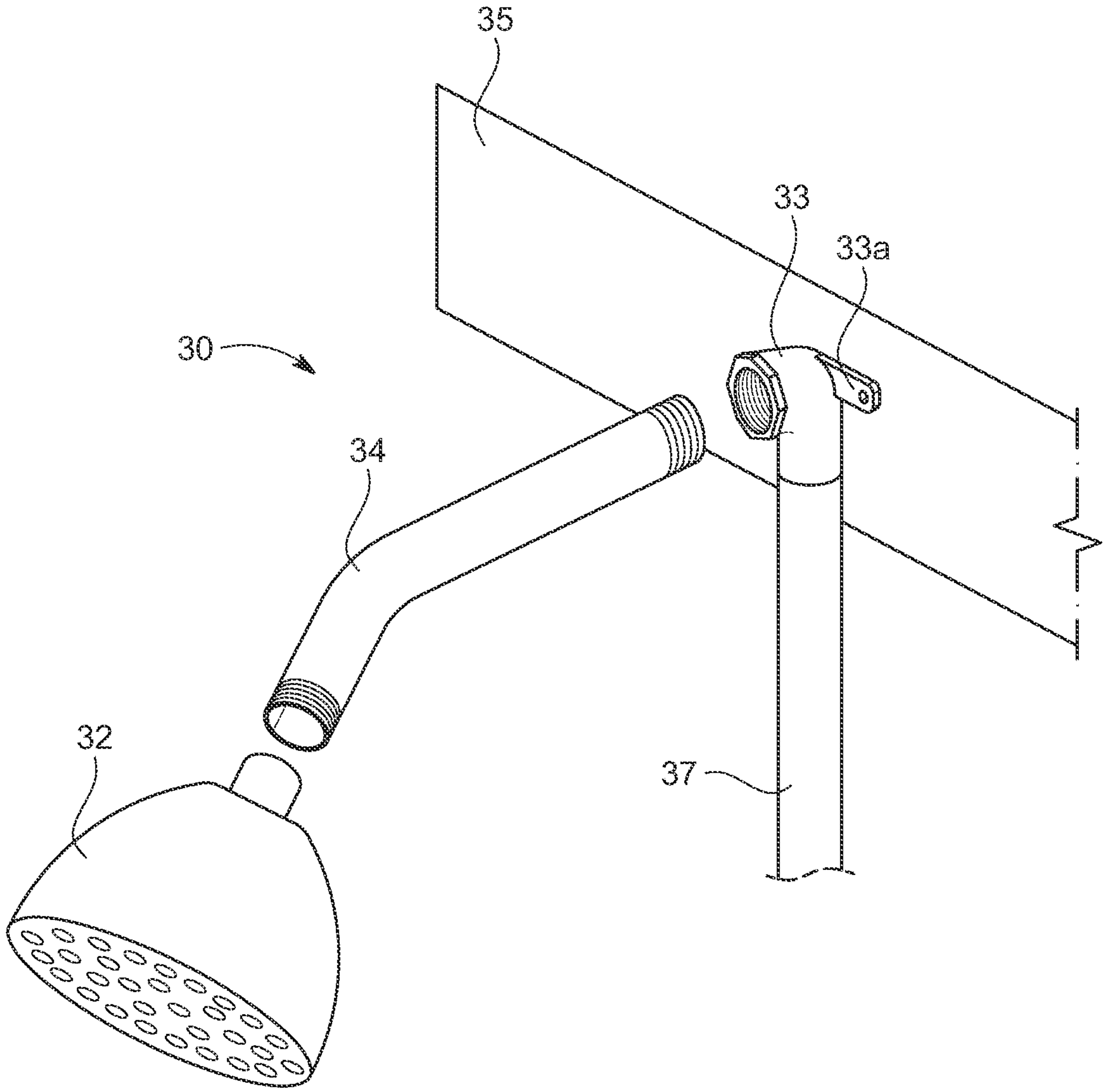
FIG. 1 (PRIOR ART)
FIG. 1 is an exploded perspective view of a showerhead assembly as is known in the prior art.

For purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 2:
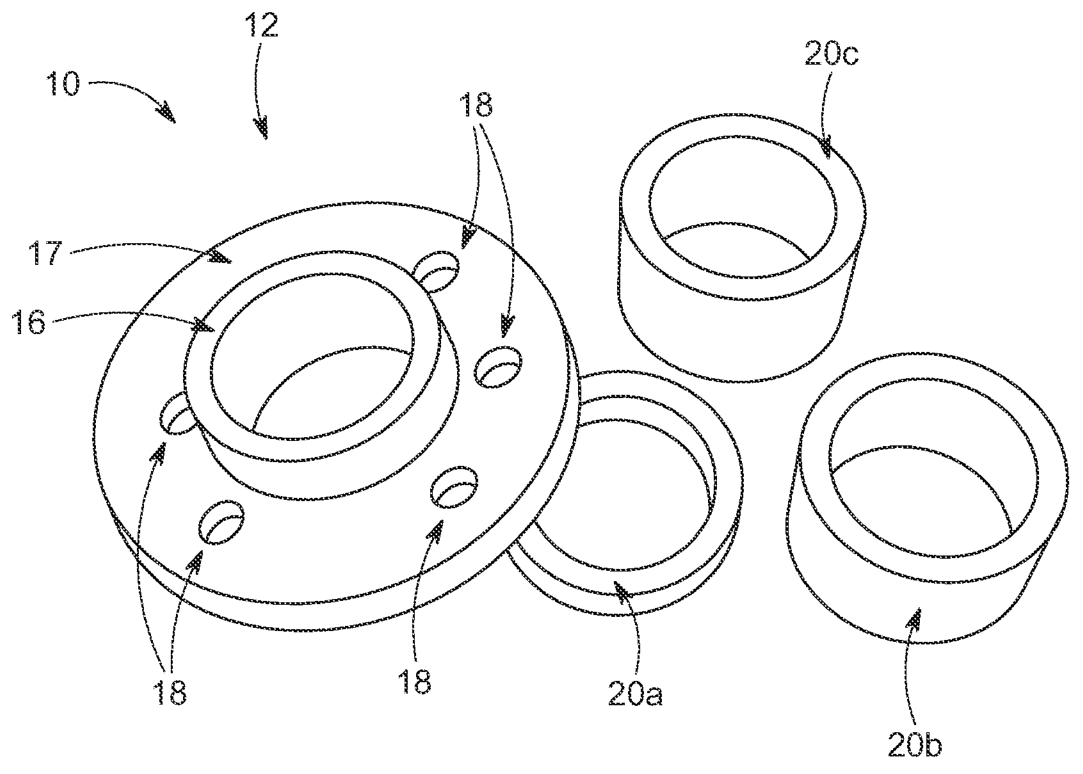
FIG. 2 is an elevational view of a showerhead stabilizer according to a preferred embodiment of the invention.
Figure 3:
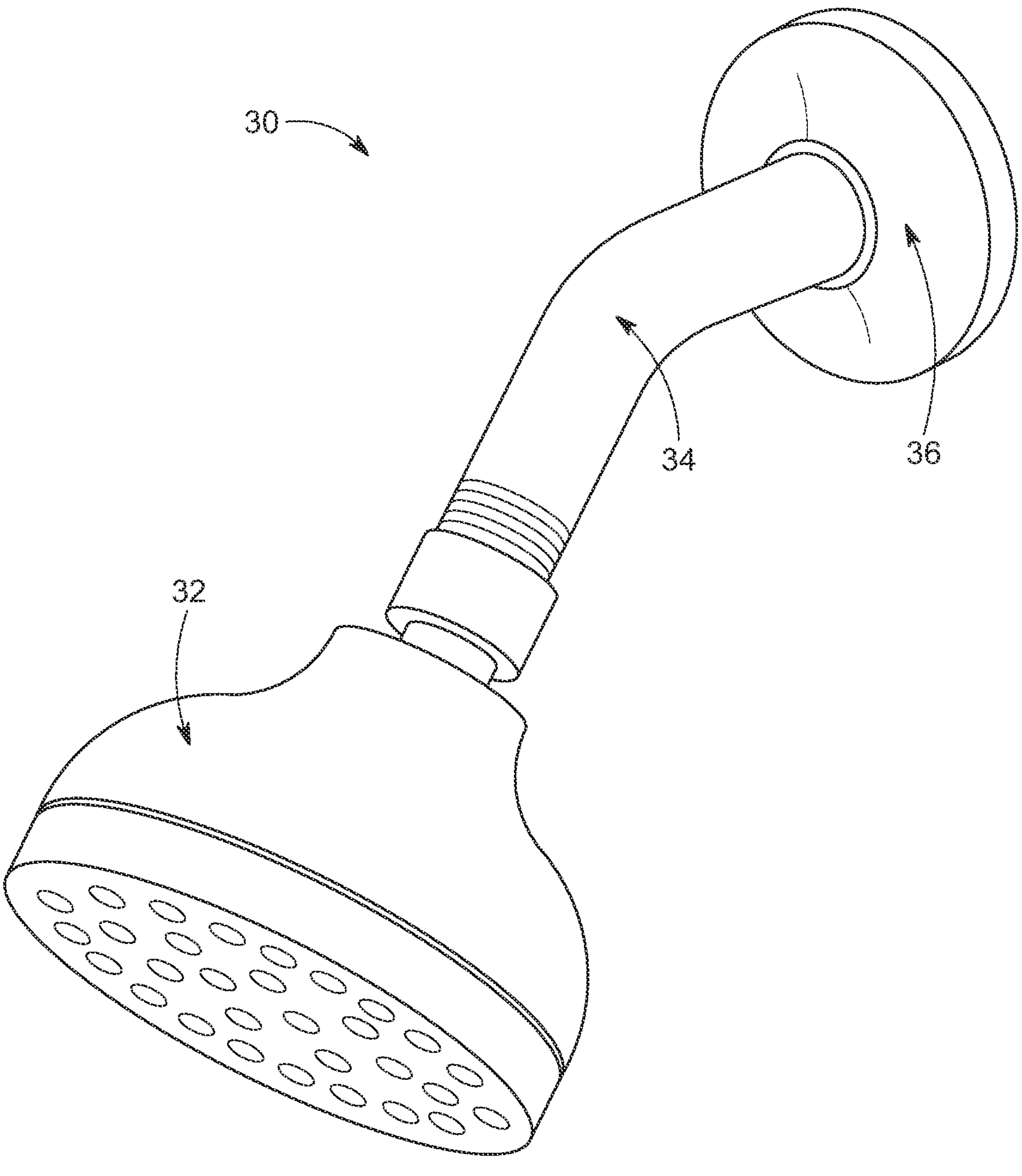
FIG. 3 is a perspective view of a showerhead assembly as is known in the prior art.

One presently preferred embodiment of the invention comprises a showerhead stabilizer assembly 10 (FIG. 2) for use in connection with a broken or loose showerhead assembly 30 (FIG. 1 and FIG. 3). The invention further includes a method of stabilizing a loose showerhead assembly 30 using the stabilizer assembly 10.

As best shown in FIG. 2, the showerhead stabilizer assembly 10 includes a stabilizer plate 12 and one or more spacers of varying sizes/thicknesses 20*a*, 20*b*, 20*c*. Although only one spacer of each size is shown in FIG. 2, it is contemplated to provide multiple spacers of varying sizes to accommodate varying depths of the wall cavity between the scab board rear surface of the wall 39, which can be drywall or other wall material, and the elbow fitting 33. The stabilizer plate 12 includes a spacer contact nipple 16 and a circular flange 17 having a plurality of mounting holes 18 formed therein.

Figure 4:
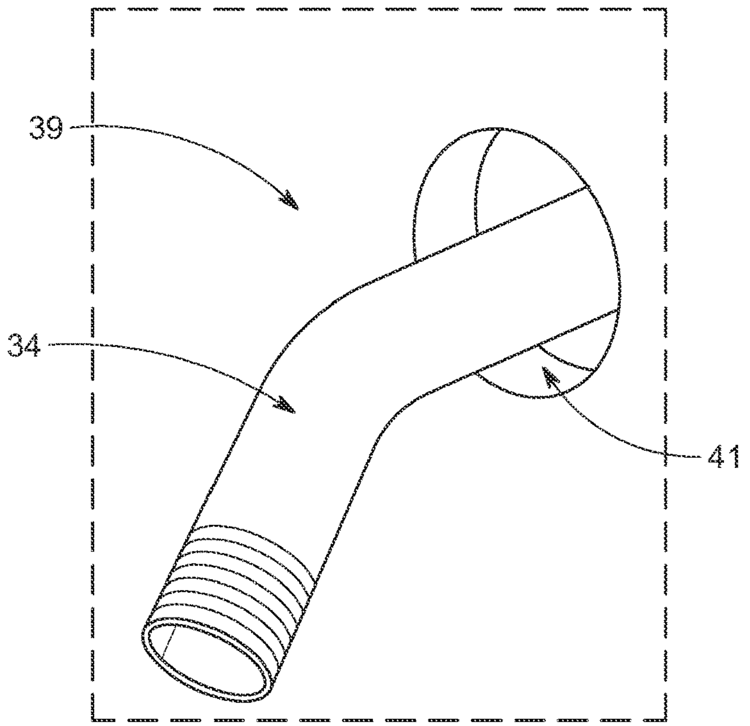
FIG. 4 is a perspective view of a shower arm pipe as is known in the prior art.
Figure 5:
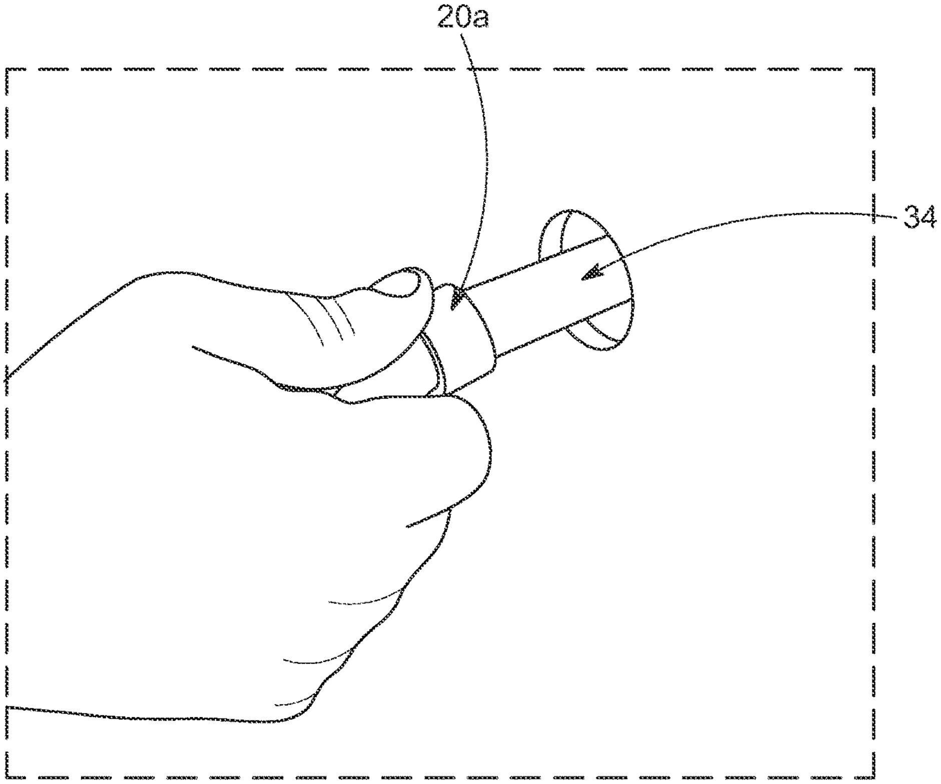
FIG. 5 is a perspective view of the step of installing a first spacer over a shower arm pipe according to a preferred embodiment of the invention.
Figure 6:
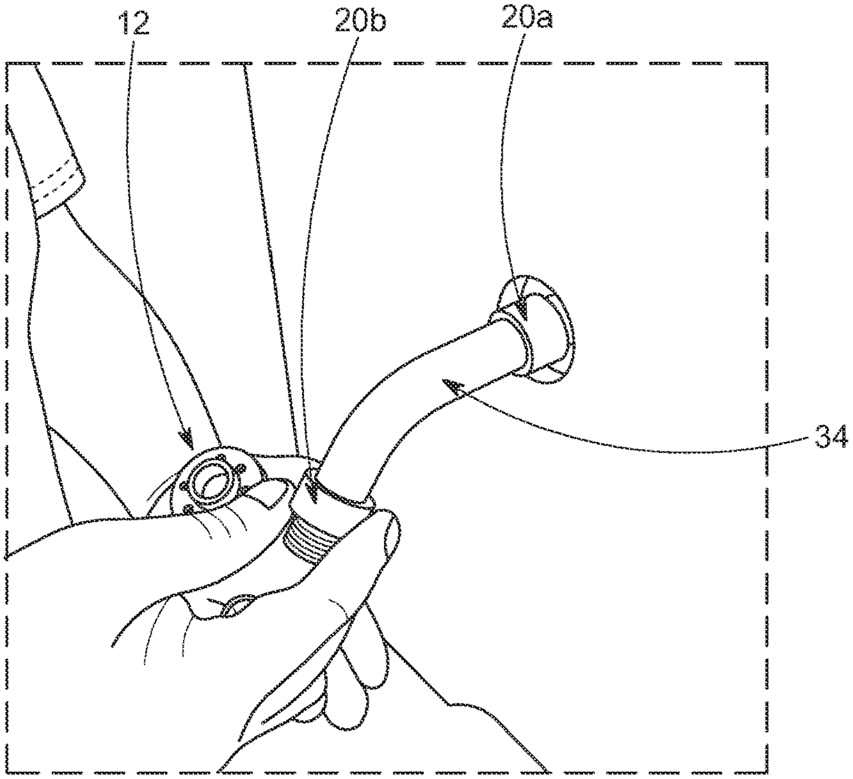
FIG. 6 is a perspective view of the step of installing a second spacer over a shower arm pipe according to a preferred embodiment of the invention.
Figure 7:
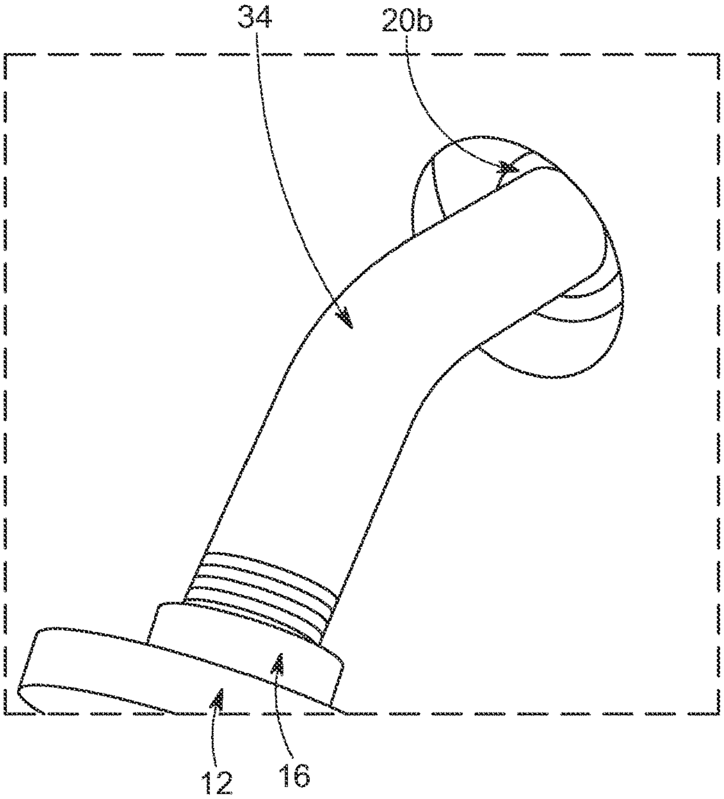
FIG. 7 is a perspective view of the step of installing a stabilizer plate over a shower arm pipe according to a preferred embodiment of the invention.
Figure 8:
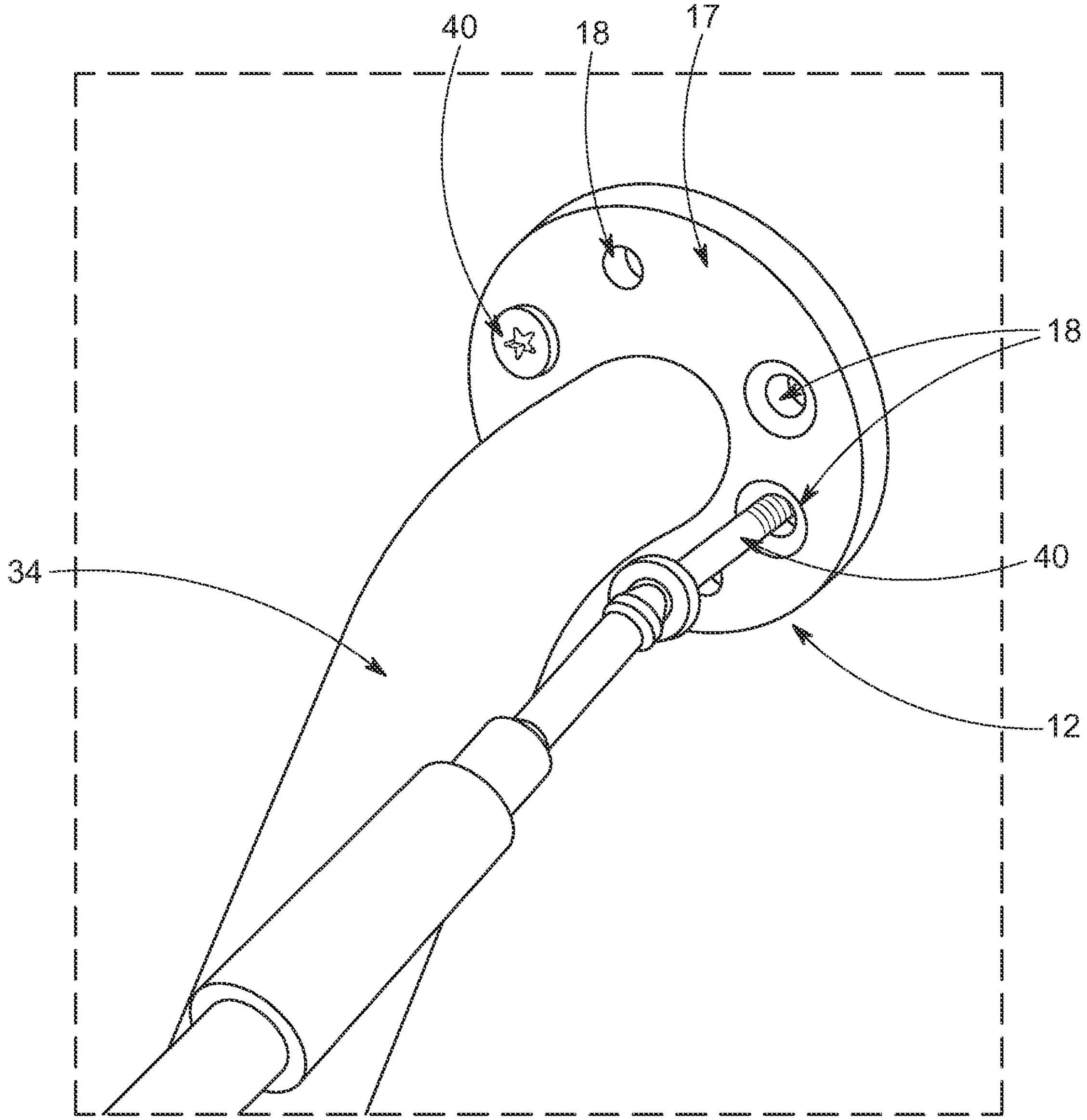
FIG. 8 is a perspective view of the step of installing fasteners to secure the stabilizer plate to the wall according to a preferred embodiment of the invention.
Figure 9:
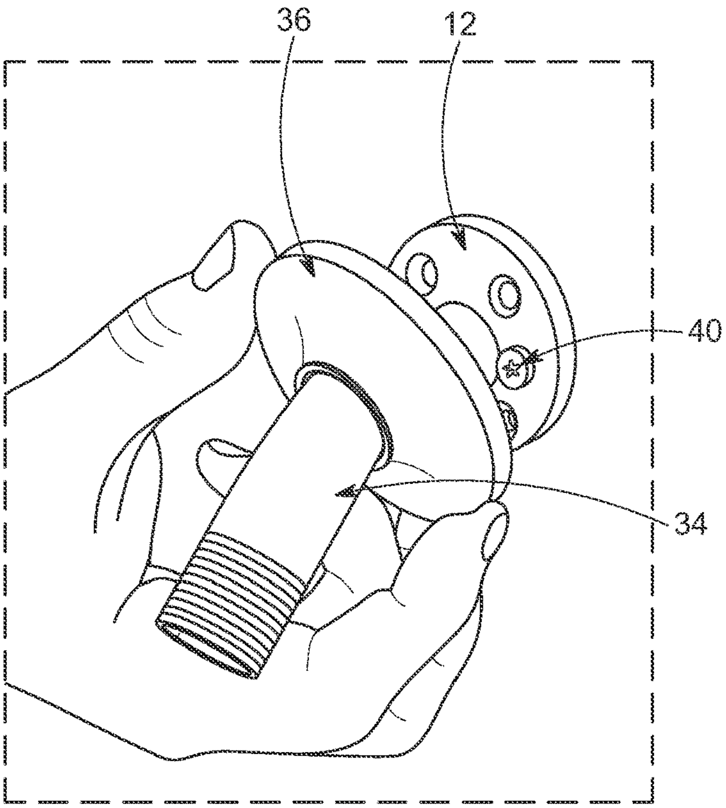
FIG. 9 is a perspective view of the step of re-installing the snap on cover over the stabilizer plate according to a preferred embodiment of the invention.
Figure 10:
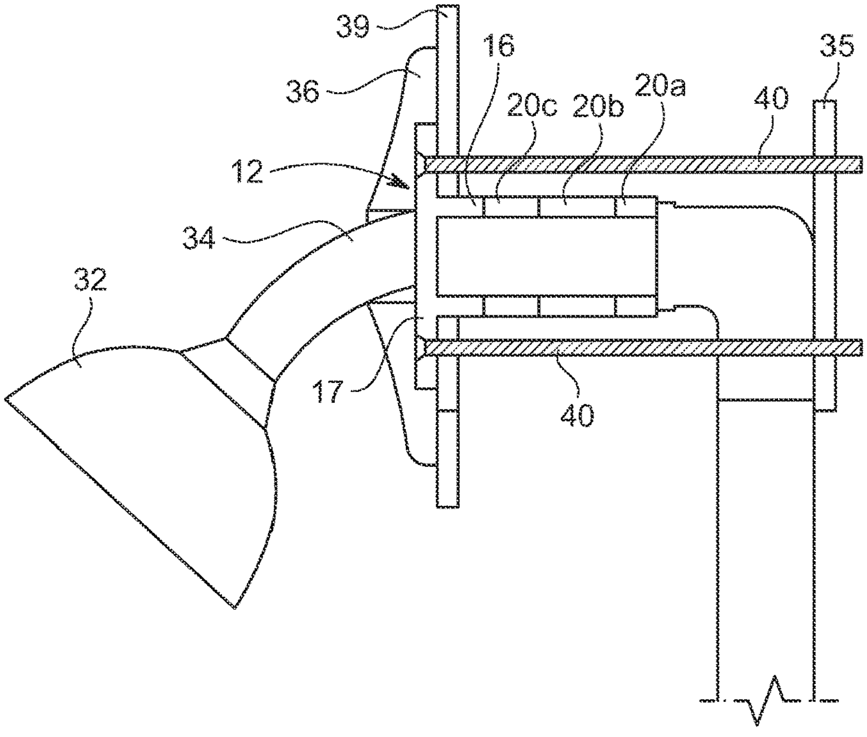
FIG. 10 is a diagrammatic planar side view of an installed showerhead stabilizer plate and spacers according to a preferred embodiment of the invention.

FIG. 3-FIG. 10 depict the steps involved in using the showerhead stabilizer assembly 10 to repair a loose showerhead assembly 30. The first step, as best shown in FIG. 3-FIG. 4, includes removal of the showerhead 32 and snap-on cover or flange 36 from the shower arm pipe 34 thereby exposing the loose shower arm pipe 34 as it projects through the opening 41 in the wall 39. The second step, as best shown in FIG. 5-FIG. 6 and FIG. 10, includes installing one or more spacers 20*a*, 20*b*, 20*c* onto the shower arm pipe 34 to a depth that creates a hard stop against the elbow fitting 33 and scab board 35 (see FIG. 10). While FIG. 6 shows two spacers 20*a*, 20*b* being installed over the shower arm pipe 34, a single spacer or any number of spacers may be used so long as a hard stop is created. The third step, as best shown in FIG. 7, includes installing the stabilizer plate 12 such that the spacer contact nipple 16 creates a hard stop against the spacer 20*b* and the circular flange 17 is in contact with the front surface of the wall 39. The fourth step, as best shown in FIG. 8 is to secure the stabilizer plate by installing one or more fasteners 40 in appropriate mounting holes 18. The last step, as best shown in FIG. 9, is to replace the snap on cover or flange 36 such that it covers the stabilizer plate 12.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A showerhead stabilizer assembly for use in connection with a broken or loose showerhead assembly wherein an elbow fitting located behind a wall is not secured to a scab board located behind the wall and behind the elbow fitting, said showerhead stabilizer assembly comprising:

a. a stabilizer plate comprising a cylindrically shaped spacer contact nipple having a first end affixed to a flange, said flange extending outwardly from said spacer contact nipple and having a circular opening therein that is aligned with an interior of the cylindrically shaped spacer contact nipple for receiving a shower pipe arm of the showerhead assembly such that the contact nipple extends through the wall toward the scab board and elbow fitting, the opening in the flange and interior of the cylindrically shaped spacer contact nipple sized to receive said shower pipe arm therein;

b. at least one cylindrically shaped spacer having a length and an interior sized to receive said shower pipe arm therein, said at least one spacer positioned between said stabilizer plate and said elbow fitting; and c. a plurality of fasteners, each of said fasteners having a first end configured to engage a surface of said flange and a second end extending through the wall, past the elbow, and configured to engage the scab board to secure the showerhead assembly.

2. The showerhead stabilizer assembly according to claim 1, wherein said flange is circular shaped and extends radially outwardly from said spacer contact nipple.

3. The showerhead stabilizer assembly according to claim 1, wherein said at least one cylindrically shaped spacer comprises a plurality of cylindrically shaped spacers.

4. The showerhead stabilizer assembly according to claim 3, wherein each of the plurality of spacers has a different length.

5. The showerhead stabilizer assembly according to claim 1, wherein said plurality of fasteners comprise a plurality of screws, wherein the second end of each screw is threaded and the first end includes a head for engaging said flange.

6. The showerhead stabilizer assembly according to claim 5, wherein the flange includes a plurality of openings therein, each opening sized to allow the second end and a shaft of the screw to pass through, but engage the head.

* * * * *